J. & J. MONTGOMERY.
Grain Winnower.
No. 13,062.
Patented June 12, 1855.
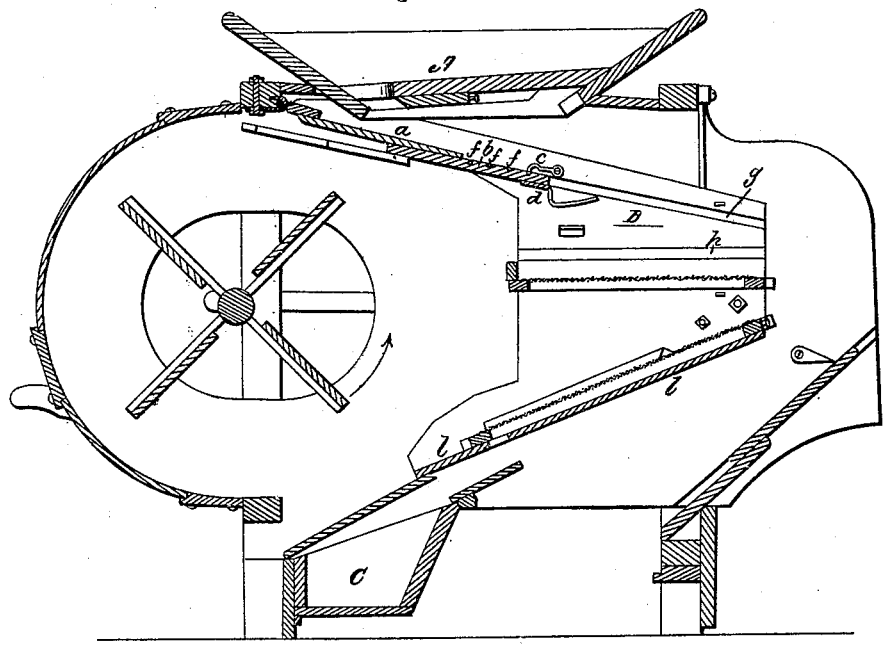
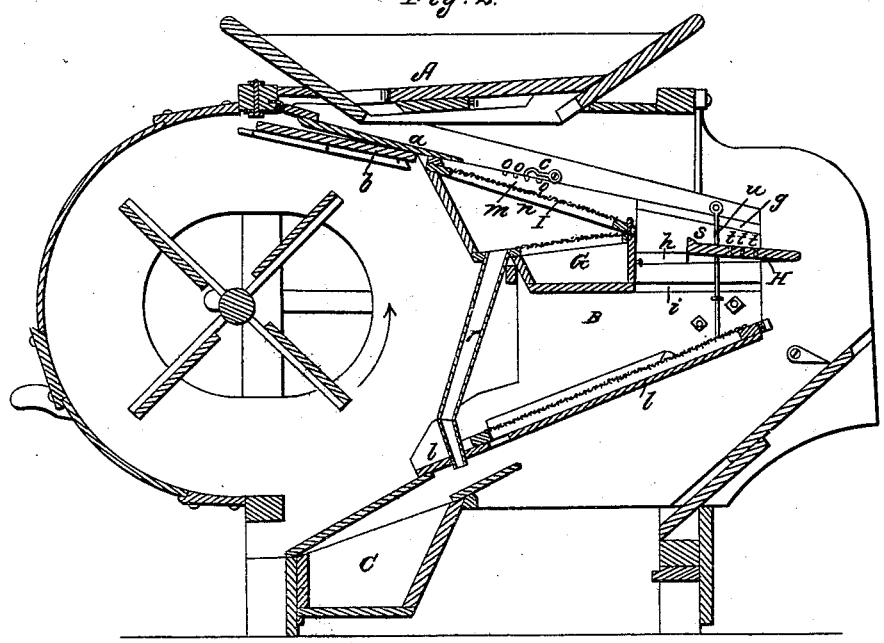

UNITED STATES PATENT OFFICE.

JOSEPH MONTGOMERY, OF LANCASTER, PENNSYLVANIA, AND JAMES MONTGOMERY, OF BALTIMORE, MARYLAND.

WHEAT-FAN.

Specification of Letters Patent No. 13,062, dated June 12, 1855.

*To all whom it may concern:*

Be it known that we, JOSEPH MONTGOMERY, of Lancaster, in the county of Lancaster and State of Pennsylvania, and JAMES MONTGOMERY, of Baltimore, in the county of Baltimore and State of Maryland, have invented a new and Improved Fan for Cleaning Wheat and other Grains; and we do hereby declare that the following is a full and exact description thereof, reference being had to the accompanying drawings, making part of this specification.

Figure 1, is a longitudinal, vertical section of our improved fan, arranged for "chaffing"; and Fig. 2, a similar section of the fan, arranged for cleaning the grain after being "chaffed."

Like letters designate corresponding parts in both figures.

The nature of our invention consists, first, in constructing the apron, which receives the uncleaned grain from the hopper, so that it can be contracted to a much less surface than is necessary to throw the grain upon the ordinary screens, by dividing it into two parts and arranging them so that the lower part may slide up beneath the upper or stationary part, or by an equivalent device; for the purpose of inserting additional screen surface when required; secondly, in constructing the screen box with the addition of a plate, or apron, under its upper screen, for conveying whatever passes through said screen to the front part of the box, and of a fine screen at the bottom, for separating sand, or grit, from the small grain and seeds caught therein, in combination with a box, or its equivalent, beneath, for collecting, or conveying away, the sand, or grit, thereby separated; thirdly, in adding an adjustable board, or shelf, in the front part of the shoe, so situated that light and bulky impurities blown from the apron, may be caught thereon and conveyed out of the shoe, while sufficient space is left behind and below it, for the whole extent of screen beneath to be employed to receive the grain, substantially as hereinafter set forth.

We construct the apron in two parts; the upper part $a$ being fixed in the top of the shoe, and of as little width as the various uses of the fan may ever require the whole apron to be; while the lower part $b$ is made to slide immediately beneath the upper part, in the top groove $g$ of the shoe B, so that it can be pushed up entirely under the fixed part $a$, or drawn down its whole width before said fixed part, or secured in any intermediate position. Its width is such that when added to that of the fixed part, the whole extent of the apron will be as great as the purposes of the fan may ever require. It is held in any position by a hook $c$, or its equivalent, which may be introduced into any one of a series of holes $f\ f$, (indicated by dotted lines in Fig. 1,) in the side thereof.

For "chaffing," (as exhibited in Fig. 1,) the apron is used in connection with the rake $d$, which is inserted in the inclined grooves $g$, pushed back till it falls into notches, at the bottom of said grooves, situated in the proper positions and of such a depth that the sliding part $b$, of the apron, will just slip over said rake. The sliding board $b$ is then fastened in such a position that its front edge reaches just to the front edge of the rake head, or bar. The rake thus arranged, remains firmly in its place without any other fastening; and it is removed or inserted with great ease.

In Fig. 2, the fan is represented as arranged for cleaning wheat after being "chaffed." The screen box D is of the same form and used in the same manner as the additional "shoe," or box, secured to us by Letters Patent bearing date the 20th day of December, 1853. It has also the same frame I, provided with the screen $m$, on its top, for separating the blighted grain, wild seeds, and fine impurities from the full grain; and the pipe $r$, extending from the hind part thereof down through the lower part of the shoe bottom $l$, for the purpose of conveying the said blighted grains and wild seeds to a box C, arranged for their reception. But in addition to those parts, the present improved screen box is provided with an inclined plate, or apron, $n$, under the upper screen $m$, and extending forward nearly to the front edge thereof, for the purpose of receiving whatever passes through said screen, and conveying it to the front part of the screen box. It also has an additional screen $p$, at the bottom, of such a degree of fineness that it will not not let the grain and useful seeds pass through, but at the same time will allow the sand, or grit, which is generally found mixed therewith, in considerable quantities, to pass through and be separated therefrom. This sand, or grit, is caught in a box G, beneath the screen box, and retained, or conveyed out of the machine. By means of this construction of the screen box, the blighted or inferior grain, and seeds mixed therewith, which are much fed to horses, are freed from the sand, or grit; so that they may be given to horses without injuring their teeth or health. And this inferior grain may thereby be cleaned so as to furnish an additional quantity suitable for the market. The screen box is inserted in the upper groove $g$, of the shoe, and confined there in any position by the hook $c$, being inserted in any one of the series of holes $o$ $o$, (indicated by dotted lines in Fig. 2,) in the side of the box. The movable part $b$, of the apron, is pushed back, out of the way, when the screen box is inserted; so that a large amount of screen surface is obtained, thus enabling the fan to do a much larger amount of work in a given time, than fans not having our adjustable apron.

Our last improvement consists in employing a board, or shelf, H, (Fig. 2,) of convenient width, in the front part of the shoe, for the purpose of catching light heads of grain, garlic seeds, and other light, or bulky, impurities, which may be blown forward sufficiently to be caught upon it, but which would otherwise fall upon the screen and pass through or clog it. Said board may be made inclined forward slightly, and have a ledge $s$ projecting above its hind edge, to prevent the substances from falling off upon the screen behind. It is generally inserted in the middle groove $h$, of the shoe, or in a groove provided for its reception. It is furnished with a series of holes $t$ $t$, (indicated by dotted lines in Fig. 2,) through any one of which a rod, or pin, $u$ passes and secures it in place, whereby it may be adjusted in any position according to circumstances. For convenience' sake, it is represented in the drawings, as used in connection with the screen box D; but we more frequently employ it in cleaning, when said screen box is not employed; and then a screen is inserted in the lower groove $i$, of the shoe, between which screen and said board above, there is sufficient room to allow the whole surface of said screen to be covered with grain, so that no screen surface is lost by using the board. The apron is so adjusted in connection with said board that the light impurities when blown forward, will fall properly upon the board, so as to produce the most efficient action. Said board may also be used in "chaffing."

What we claim as our invention and desire to secure by Letters Patent is—

1. Connecting the screen box with the addition of a plate, or apron, under its upper screen, for conveying whatever passes through said screen to the front part of the box, and of a fine screen at the bottom, for separating sand, or grit, from the small grain and seeds caught therein, in combination with a box, or its equivalent, beneath, for collecting, or conveying away, the sand, or grit, thereby separated.

2. We also claim, adding an adjustable board, or shelf, H, in the front part of the shoe, so situated that light and bulky impurities blown from the apron, may be caught thereon and conveyed out of the shoe, while sufficient space is left behind and below it, for the whole extent of screen beneath, to be employed to receive the grain; substantially as herein set forth.

In witness whereof I have hereunto set my hand this 26th day of Feb'y, 1855.

JOSEPH MONTGOMERY.

Witnesses:
J. C. VAN CAMP,
JOHN BECKEL.

In witness whereof I have hereunto set my hand this 28th day of February 1855.

JAMES MONTGOMERY.

Witnesses:
ROBERT GARDINER,
WILLIAM D. ELDRIDGE.